US008630889B2

(12) United States Patent
Hornstein

(10) Patent No.: US 8,630,889 B2
(45) Date of Patent: Jan. 14, 2014

(54) AESTHETIC PROFILE COLLECTION

(76) Inventor: David Hornstein, Lexington, MA (US)

( * ) Notice: Subject to any disclaimer, the term of this patent is extended or adjusted under 35 U.S.C. 154(b) by 621 days.

(21) Appl. No.: 11/744,316

(22) Filed: May 4, 2007

(65) Prior Publication Data
US 2007/0213948 A1   Sep. 13, 2007

Related U.S. Application Data

(63) Continuation of application No. 09/543,868, filed on Apr. 5, 2000, now Pat. No. 7,228,283.

(51) Int. Cl.
*G06Q 10/00*   (2012.01)
(52) U.S. Cl.
USPC ............................................. 705/7.29
(58) Field of Classification Search
USPC ................................... 705/7, 7.29
See application file for complete search history.

(56) References Cited

U.S. PATENT DOCUMENTS

| | | | | |
|---|---|---|---|---|
| 5,493,490 | A | * | 2/1996 | Johnson .......................... 705/26 |
| 5,495,602 | A | * | 2/1996 | Harada et al. .................. 707/10 |
| 5,526,257 | A | * | 6/1996 | Lerner ............................ 705/10 |
| 5,550,746 | A | * | 8/1996 | Jacobs .......................... 700/231 |
| 5,875,110 | A | * | 2/1999 | Jacobs .......................... 700/232 |
| 5,991,780 | A | | 11/1999 | Rivette et al. |
| 6,009,410 | A | | 12/1999 | LeMole et al. |
| 6,012,051 | A | | 1/2000 | Sammon, Jr. et al. |
| 6,553,386 | B1 | * | 4/2003 | Alabaster ................... 707/104.1 |
| 7,246,110 | B1 | * | 7/2007 | Musgrove et al. ............... 707/3 |
| 8,036,929 | B1 | * | 10/2011 | Reisman ..................... 705/7.29 |

\* cited by examiner

*Primary Examiner* — Romain Jeanty

(57) ABSTRACT

A system for selecting products is described. The system includes a computer executing a process to retrieve a product aesthetic tag associated with a particular product type selected by a customer. The aesthetic tag contains values that represent aesthetic features of the product and a process to form a result tag that contains a value corresponding to how well aesthetic features of the product match to aesthetic preferences of the customer.

15 Claims, 14 Drawing Sheets

FIG. 14

| Scale | level A | level B | level C |
|---|---|---|---|
| Form | Closed, solid | Some solid, some open | Open, not dense |
| Form | Curvy, organic | Minimal curves Straight lines | Straight lines |
| Form | Simple, minimal parts | Typical number of parts | Complicated, many parts |
| Materials | Organic, natural / value / picture | Some natural, some manuf / value / picture | Manufactured, machined look / value / picture |
| Decoration | No decoration added | Some decoration | Highly decorated |
| Decoration | Inherent in form | Inherent and added Separate from form | Separate from form |
| Decoration | Natural, organic | Stylized, not symbolic | Symbolic motif |
| Overall Appearance | Quiet, peaceful | Somewhat attention-getting | Loud, boisterous |
| Overall Appearance | Playful, humorous | Not playful, not formal | Formal, serious |
| Overall Appearance | Handmade crafted | Some handmade details | Manufactured, no handmade |

AESTHETIC PROFILE COLLECTION

This application is a continuation application of and claims the benefit of application Ser. No. 09/543,868 filed Apr. 5, 2000 now U.S. Pat. No. 7,228,283, entitled "AESTHETIC PROFILE COLLECTION".

BACKGROUND

This invention relates to electronic commerce on the Internet, and applied market research both on and off-line.

The Internet has become a vehicle for buying products of all types. When shopping on the Internet, a buyer may search a database for products that have been catalogued by a particular style name. For example, if shopping for furniture, a shopper can ask for products that are classified as "Contemporary." Similarly in clothing, a consumer may search by specifying multiple, objective criteria such as color and price range (e.g., blue shirt under $20). The shopper would receive results listing shirts that matched the color and price specifications. The results could be very numerous and the shirts could be of very different styles, many of which may not appeal to the customer. The shirts could have nothing in common with each other, other than that they are blue and under $20. Searching for furniture products is generally done based on style name, e.g., "Traditional", "Contemporary", "Country", and so forth.

SUMMARY

Style names do not have specific meanings, that is, there is no agreed upon meaning for what constitutes "Traditional" or "Contemporary" furniture. Styles are an attempt to assemble collections of aesthetic attributes into discrete sets, to distinguish styles from other styles, and therefore divide an entire category (e.g., furniture) into smaller searchable units. There can be considerable overlap between styles. A particular chair design might be considered "Contemporary", "Country", "Transitional", or "Shaker". Because there is no clear consensus as to what combination of material and aesthetic attributes constitutes a particular style. A Contemporary light fixture for example, could be a simple glass piece or it could be a complicated fixture made out of wood and aluminum and other materials. Moreover, a simple light fixture could exist that includes Traditional and Contemporary elements. Shaker style is considered a Traditional style, but it also embodies simplicity which is characteristic of Contemporary style. This confusion is compounded since few consumers have specific knowledge as to what the various style names mean. Thus, styles and style names are not sufficiently accurate descriptors to allow consumers to easily identify furniture they would find appealing.

On the Internet, product selection is often larger than in off-line stores, which are limited by the physical constraints of their display space. The downside of Internet shopping is that there may not be sufficient bandwidth (either transmission bandwidth or a user's continued attention span) to show many products very quickly. Thus, a customer is unlikely to see all possible products that are available and which are desirable to the customer. Rather the customer would have to sort through a large number of products. This is particularly true with an Internet based store that may sell products from many different vendors.

One aspect of the invention is to provide a sorting technique that is based primarily on visual and aesthetic characteristics.

According to an aspect of the present invention, a method for selecting products that occurs over a networked computer system includes retrieving a product aesthetic tag associated with a particular product type selected by a customer, the aesthetic tag containing values that represent aesthetic features of the product and forming a result tag that contains a value corresponding to how well aesthetic features of the product match to aesthetic preferences of the customer.

According to an additional aspect of the present invention, a computer program product residing on a computer readable medium for selecting products over a networked computer system includes instructions to cause a computer to retrieve a customer aesthetic profile, the customer aesthetic profile tag having aesthetic profile preferences of the customer, retrieve a product aesthetic tag associated with a particular product type selected by the customer that has aesthetic features of the product, compare customer aesthetic profile tag to the product aesthetic tag, and form a result tag that contains a value corresponding to how well aesthetic features of the product match to aesthetic preferences of the customer.

BRIEF DESCRIPTION OF THE DRAWINGS

FIG. 14 is a diagram of a web page that depicts a graphical user interface adaptable for use in the processes of FIGS. 4 and 13.

DETAILED DESCRIPTION

Figure 1:
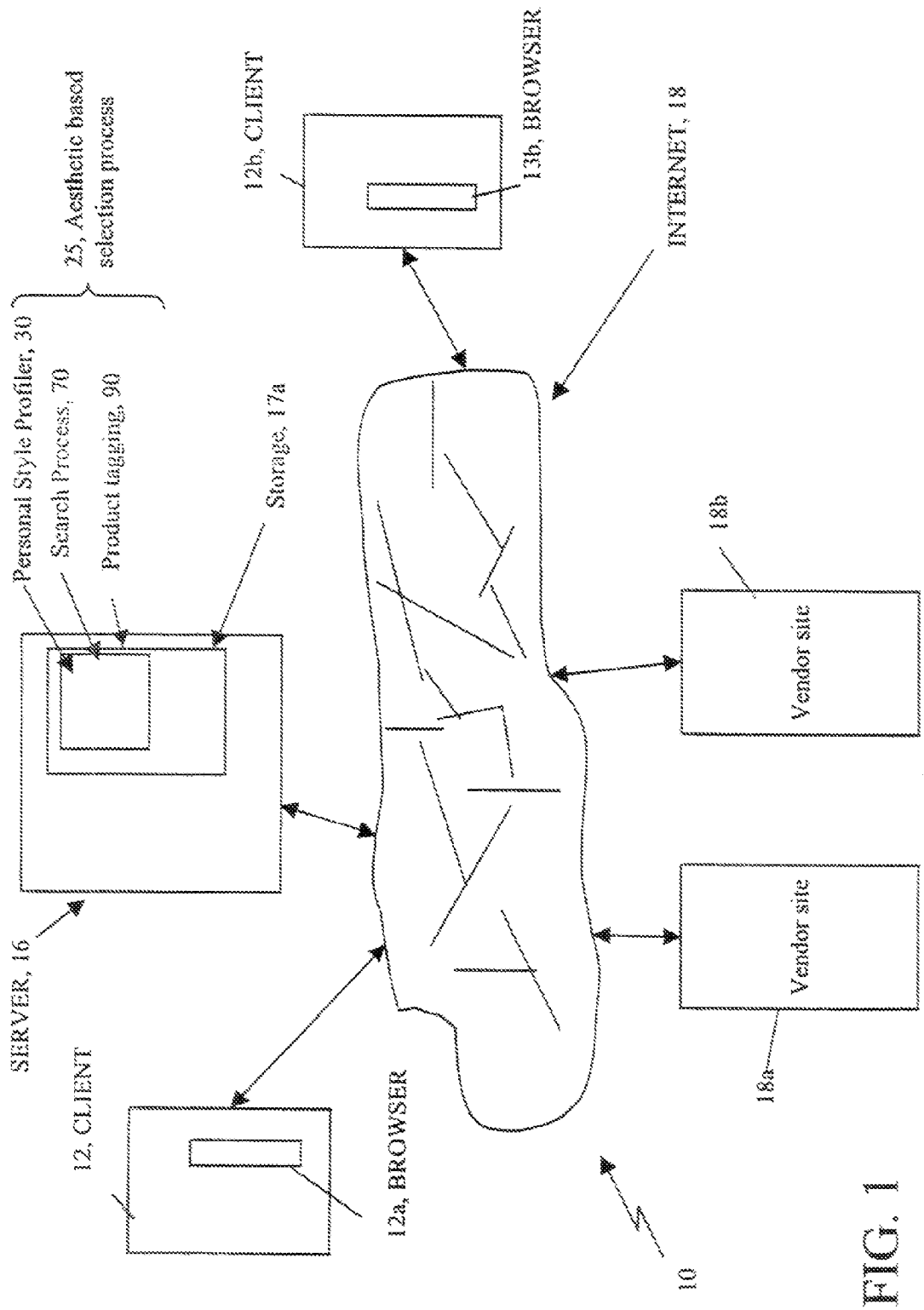
FIG. 1 is a block diagram of a networked computer system including a server that executes a profile collection and product selection process.

Referring now to FIG. 1, a system 10 for collecting aesthetic profile information and for selecting products based on matching aesthetic profile information to aesthetic characteristic of products is shown. The system 10 uses a public network such as the Internet 18, as shown. Other types of network arrangements such as an Intranet or a local or wide area network, and so forth can be used. The system 10 includes one or more client stations 12 running a web browser program 12a or equivalent interface. The clients 12 are coupled to the Internet 18 and to vendor sites 18a-18b and/or a server 16. The server 16 includes a storage medium 17 and has residing on the storage medium 17 an aesthetic profiling and search process 25. The aesthetic profiling and search process 25 includes a personal aesthetic profiler process 30 that can collect profile information of clients at client stations 12, an aesthetic based product search and matching engine 70, and an aesthetic-based product tagging process 90.

In particular, the personal aesthetic profiler process 30 collects aesthetically-based profile information of clients, as will be described below. The product search and matching engine 70 searches for products that are tagged with aesthetic-based specifications that are based on aesthetic profile information collected by the tagging process 90.

The product search and matching process 70 is shown residing on the server 16 but could reside on individual vendor sites 14*a* and 14*b*, as also shown. Thus, the product search and matching process 70 can be executed as an individual site-based service for searching external multiple vendor sites 14*a* and 14*b* or, alternatively, the process 70 can be run on individual vendor sites to internally search the site 14*a* and 14*b*. In some embodiments, the vendor sites 14*a* and 14*b* represent different non-associated vendors, whereas in other embodiments the vendor sites 14*a*, 14*b* can represent associated vendors.

Figure 2:
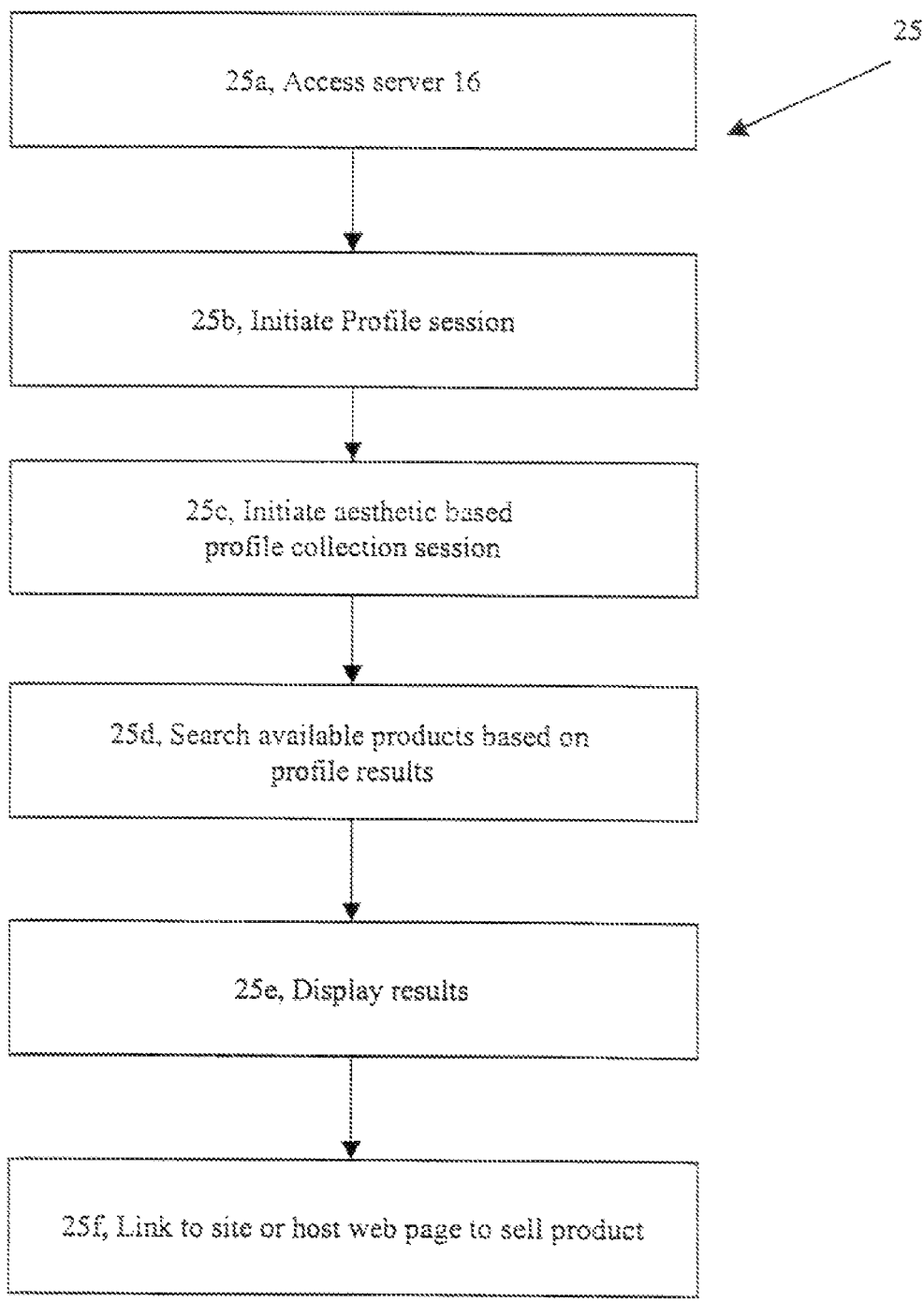
FIG. 2 is a flow chart showing a product selection process.

Referring now also to FIG. 2, the aesthetic profiling and search process 25 has the client 12 access 25*a* the intermediary web site 16. The intermediary web site 16 will send, in a conventional manner, a web page to the browser 12*a* in client system 12 to gather 25*b* initial, objective profile information. The web page will have fields for the client to fill-in initial profile information such as name, address and general, objective, non-aesthetic-based product preferences, as is further described in conjunction with FIG. 3.

After gathering initial profile information, the server 16 will initiate 25*c* an aesthetics profiling session with the user at client system 12 if current aesthetic profile information is not available for the current user. The aesthetic profile collection session collects aesthetic preferences of the individual at station 12 based upon aesthetic considerations related to various scales of form, texture, materials type and color, pattern, type and extent of decoration, overall product appearance e.g., presentation and others that are determined for each user by scoring a user's response to questions posed by viewing and grading images that are presented to the user. A technique for conducting this profiling session is described below in conjunction with FIG. 4.

After the aesthetic profile is generated or retrieved, the process 25 searches 25*d* available products based on the initial and aesthetic profile information. Aesthetic information on available products are stored in a database (not shown) that is accessed by the server 16. The entries are aesthetic-based product characteristic tags that are produced in accordance with aesthetic considerations that are attributable to the product, as will also be described below. The search process 25*d* also has a matching process that enables the user's aesthetic profile to be matched against possible tags associated with products that are available on the system 10. These potential matches are returned by the server 16 and displayed 25*e* at the client station 12 through the web browser 12*a* by returning a web page containing the results of the matching operation.

The displayed results, if returned from the server 16, as in the embodiment under consideration, can include links 25*f* to the vendor sites 14*a*, 14*b* that sell the product, and preferably to the page at which the product is displayed at the vendor site. This would also lead to additional pages where the user can find additional information about the product or purchase the product at the vendor site. Alternatively, the server 16 can provide that software service for the vendor and allow the client to directly purchase one or more products from the server site 16.

Figure 3:
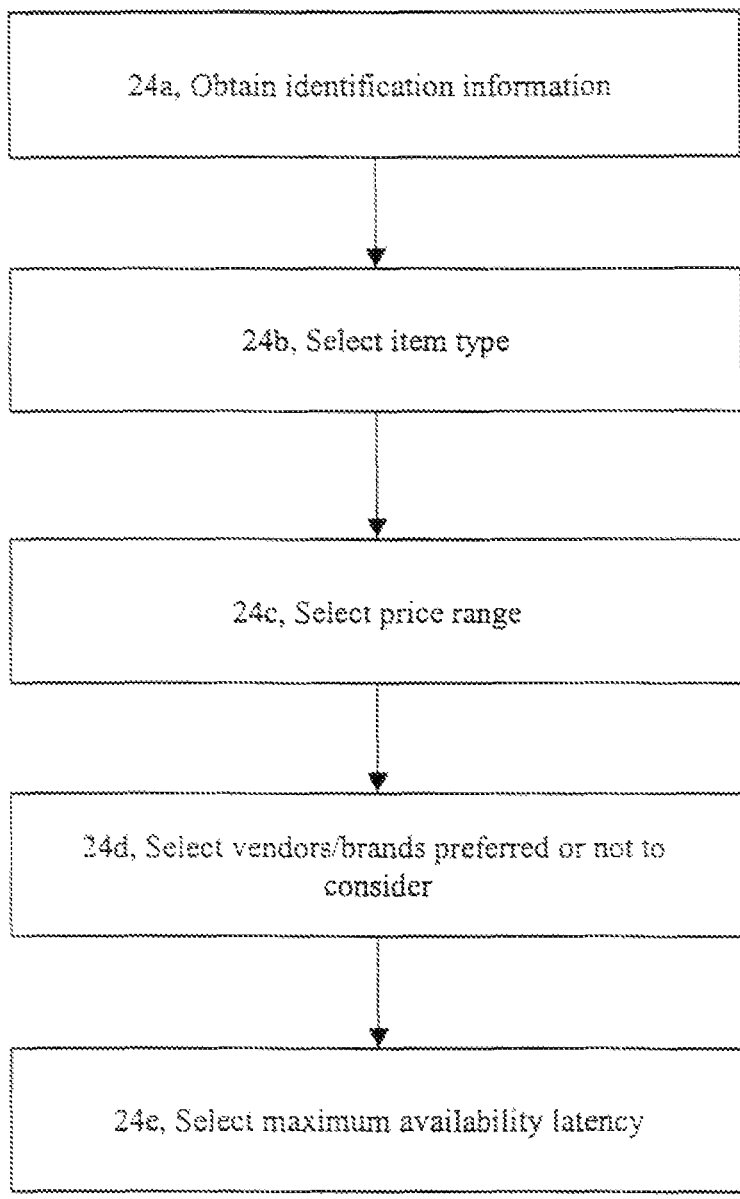
FIG. 3 is a flow chart showing a process to obtain initial information for product selection.

Referring now to FIG. 3, an initial profiling process 24 used to collect initial, objective, non-aesthetic profile information of the individual at client station 12 is shown. The profile session 24 collects information such as the identity 24*a* of the individual at the client station, information concerning the item that the client desires to search for 24*b*, as well as information regarding a price range 24*c* that the client is willing to accept, whether the client has any particular vendor or brand preferences 24*d*, as well as whether the client is concerned about availability for the product selected 24*e*.

Depending upon the nature of the product, certain of these profile questions need not be asked of the individual. For example, if the items being searched for are related to furniture, possibly the vendor or branding of the furniture can be disregarded since there is generally less brand loyalty to furniture compared to brand loyalty commonly associated with clothing, for example. With clothing, the availability profile information can be avoided since clothing is generally available; whereas, with furniture, the availability of furniture may vary from weeks to months depending upon the vendor. Of course, all of these questions and additional, objective, non-aesthetic-based questions can be asked of the individual at this time.

Figure 4:
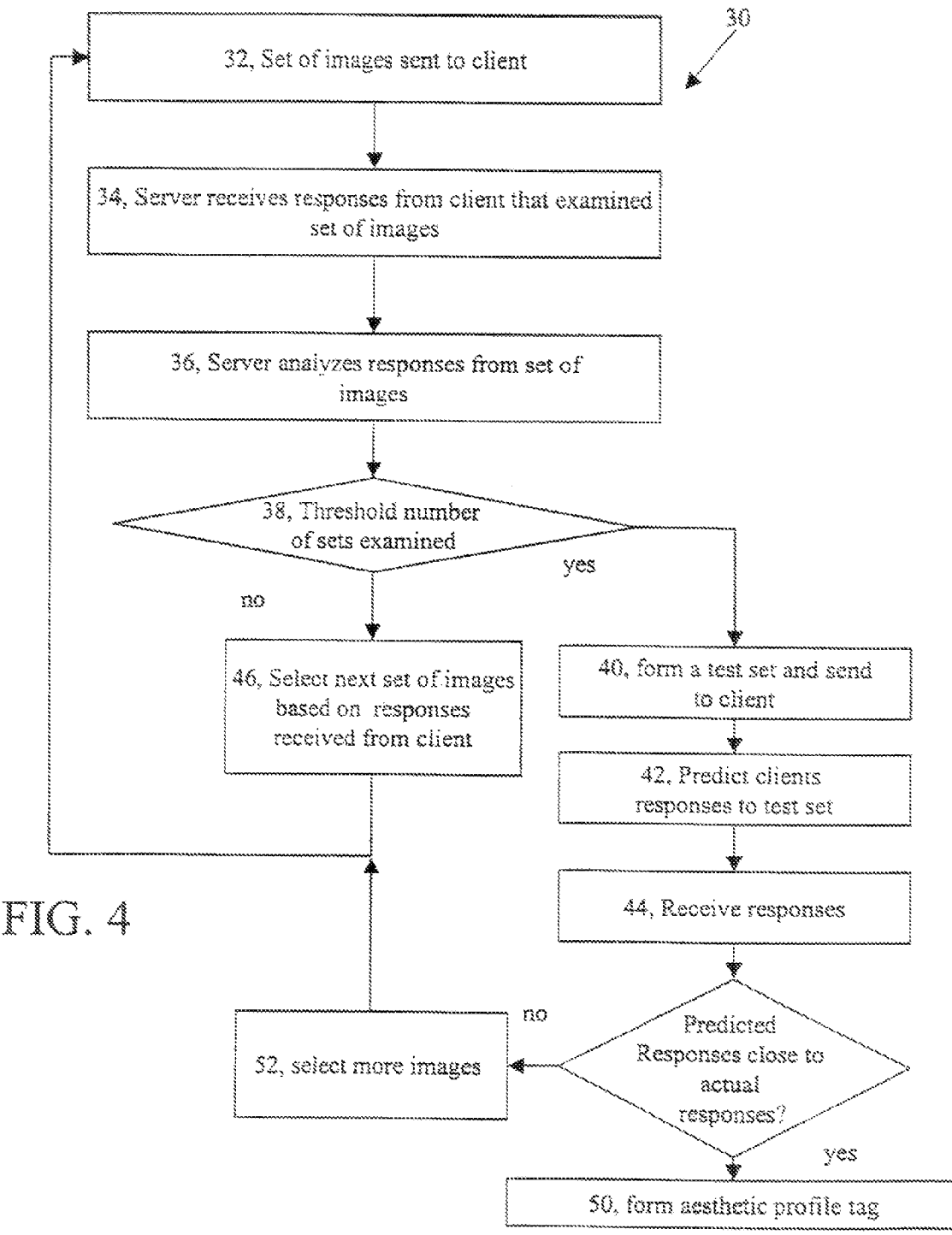
FIG. 4 is a flow chart showing a process for collecting aesthetic profile information of a customer.

Referring now to FIG. 4, an aesthetic profiling process 30 is shown. The aesthetic profiling process 30 obtains information regarding aesthetic preferences of a customer. The aesthetic profiling process 30 conducts testing of an individual's aesthetic preferences by having an individual examine selected set of images. The images are chosen or constructed to highlight one of a plurality of aesthetic scales that are rated by the process 30. The process 30 starts by an individual examining 32 an initial set of images. The set of images are chosen to emphasize a particular aesthetic scale as well as a sub-scale within each of these scales as described below. The user examines the initial set of images and indicates its preferences for likes and dislikes of the aesthetic set by grading the images on a preference scale. The responses are sent to and received 34 by the server 16. The server process 30 determines 36 whether a threshold number of exemplary sets of images have been examined by the user. If the threshold has not been reached, the server analyzes 38 the responses to determine a new set of images to send to the client.

Analysis 38 examines the results received from the user to determine whether the user has given consistent responses to the styles being tested over the set of images. For example, if the set of images test the user's preferences for shape, the analysis process 38 examines the responses for shape to determine whether the user had consistent responses over the set of images. If the responses are consistent, that is, if the user expresses a strong satisfaction for or a dissatisfaction with a particular shape scale, then the analysis process 38 can select additional sets of images that do not test for the particular style, e.g., shape. In this way, the analysis process narrows down the scales to those scales which require further testing of the user. The server 16 selects 39 a new set of images based on the analysis process 38.

If the threshold has been reached, the server 16 will send 40 a test set of images which are selected to test whether the analysis process 38 can predict the user's answers for the response. That is, whether the process has sufficiently learned the aesthetic preferences of the individual. Thus, the process 30 will form 40 a test set of images and determine 42 a predicted response for each image in the test set of images. The process 30 sends the images to the client where the client will again indicate its preferences. The server 16 will receive 44 the responses from the individual and compare 46 the responses received from the individual to the predicted responses for the individual. If there is an exact or sufficient match, the process 30 will form 50 a profile tag for the individual. If the answers do not sufficiently match, the process will submit 52 additional sets of graphics for the user to examine and the process 30 will repeat until a second threshold is reached.

The scales are several in number, e.g., 4 to 6 or more and the number of scales often are determined by the type of product. The scales are further divided into sub-scales, resulting in a total number of 10-12 or more scales. Exemplary scales and levels are shown in Table I below:

TABLE I

| Scale | level A | level B | level C |
|---|---|---|---|
| Form | Closed, solid, dense | Some solid, some open | Open, not dense |
| Form | Curvy, organic | Minimal curves | Straight lines |
| Form | Simple, minimal parts | Typical number of parts | Complicated, many parts |
| Materials | Organic, natural | Some natural, some manuf. | Manufactured, machined look |
| Decoration | No decoration added | Some decoration | Highly decorated |
| Decoration | Inherent in form | Inherent and added | Separate from form |
| Decoration | Natural, organic | Stylized, not symbolic | Symbolic motif |
| Overall Appearance | Quiet, peaceful | Somewhat attention-getting | Loud, boisterous |
| Overall Appearance | Playful, humorous | Not playful, not formal | Formal, serious |
| Overall Appearance | Handmade, crafted | Some handmade details | Manufactured, no handmade parts |
| Color | Not colorful | Somewhat colorful | Very colorful |
| Color | Choose pallete | | |
| Novelty | Unique, unusual | Some unique features | Stylized, typical |

The major scale "Form" has three sub-scales. The sub-scales of "form" are related to preferences concerning "open—closed", "curvy—straight", "simple—complicated". The scale material relate to whether natural or manufactured appearance is desired. The major scale "Decoration" has three sub-scales used to specify whether or not there are "decorative elements" whether they are "integral to the form or added to the form" and if decorative form is added the third sub-scale specifies whether the decoration is "a motif or a natural decoration". The scale "overall appearance" is used to give an overall sense of the product. Overall appearance has three sub-scales related to quiet—loudness of the overall appearance, playfulness—formality and handmade—manufactured appearance. "Color" scales test for color by using color palettes. The scales examine whether warm colors, cool colors, bright colors, soft colors, etc. appeal to the client. The scale "Novelty" relates to whether the product is consistent with the aesthetic norms for that type of product (typical) or deviates from the norms (novel).

On each of these dichotomies there are three levels. For example, in form open and close there is open, closed, and in-between. Thus, for the scales, there are three levels. The customer can assigned a numeric value to each level of each scale. In some embodiments, the number values can be selected from a range of values, e.g., onto a scale of 1 to 10, for example, or can simply be a yes (like) no (dislike).

Each scale is represented by multiple archetype examples. The examples are product images whose primary aesthetic attribute is a best example of the particular scale, and that do not strongly embody attributes of other scales. For instance, an archetype for the "solid form" scale could be a solid leather chair that has a fully enclosed seat and back. An archetype for the open form scale could be a thin metal frame chair with an open back and slat seat. The archetype for the intermediate level on the open-closed form scale could be a chair with a solid seat but an open lattice back.

The process 30 uses multiple images of each scale to conduct a test to make sure that there was not something objectionable about any particular image that was testing a particular scale. With 13 scales (scales and sub-scales) and 3 levels (A, B, C), there can be a total of 39 images that are tested. Since each tested scale can be run a number of times, e.g., three times, one such example could have a total of 117 images. That is, there are three embodiments of each level of each scale. For example, three embodiments of a chair, an open chair, an intermediate open-closed chair and a closed chair. An example of another scale, e.g., decoration, has three levels. One level is decoration that is inherent in the design. For instance, a chair whose back, seat, and legs are made from one continuous curved piece of metal has a decorative quality inherent in the form of the chair. The intermediate level of that scale could be a similar chair form that added a seat cushion and padded arms, thus introducing additional decorative elements to the basic form. The highest level of that particular scale of decoration could be a Queen Anne chair that would have many embellishments to the basic form including carved arms, legs, and back.

Another sub-scale of the scale decoration is "motif." Motif refers to a pattern of carved or applied embellishment. Natural motifs are shapes and figures intended to be visually pleasing but not representing or symbolizing any particular meaning. The highest level of the "motif" scale are decorations that have specific meaning and are references to a particular symbol. For example, pineapples are used to symbolize hospitality, or wheat staffs to symbolize abundance. These symbolic decorations are often closely linked to particular historical styles. Therefore, rather than labeling a particular piece of furniture as, for example, "traditional", the process rates its various attributes according to the scales and sub-scales, to produce a more exact definition of the piece that allows for closer alignment with the preferences of the user.

The test for furniture could only be images of chairs, because chairs embody all possible varieties of form and decoration of all furniture. Other items of furniture e.g., tables, sofas embody a more limited image. In the case of a chair, a chair allows for the most variation in a particular embodiment of that category. That is, when an individual is tested, the test can be comprised of images for a particular product, e.g., chairs that will represent a whole class, furniture. Of course, images of the particular products that a client has selected could be used in the testing phase.

For lighting, testing would use a table lamp because again it embodies all these characteristics of lamps. Some of the scales that are tested for in a table lamp may not present in track lighting. Testing using a table lamp will furnish sufficient information to select any type of lamp. The table lamp has a base, a body and a shade that captures more of the variations in lighting than would for example a sconce.

Clothing, in addition to characteristics such as price and vendor, can include objective, non-aesthetic characteristic such as purpose, e.g., dress, casual or outdoor; material e.g., synthetics or natural fibers, nylon or rayon, cotton or wool. For each objective, non-aesthetic characteristic, the client can express no preference or could indicate a strong preference only for certain of these characteristics. When testing for clothing-based aesthetics, the testing process could test for shirts to represent the entire category of clothing. The testing would have the user respond to specific items such as a collar, a cuff, the manner in which the clothing hangs, whether the clothing is loose or tight, the transparency of the material. The process would test for both tangible and aesthetic attributes.

After the user takes the profiling test, or at any other point when they are visiting the site, they can elect to view their profile. The viewed profile would appear as the table of scales for the given category (clothing, furniture) and the level "A", "B", or "C", that they had scored highest in highlighted. They could elect to edit their profile by highlighting a different level. This altered profile could be saved under a different name, or could be a change to their primary profile, at the users option.

Figure 5:
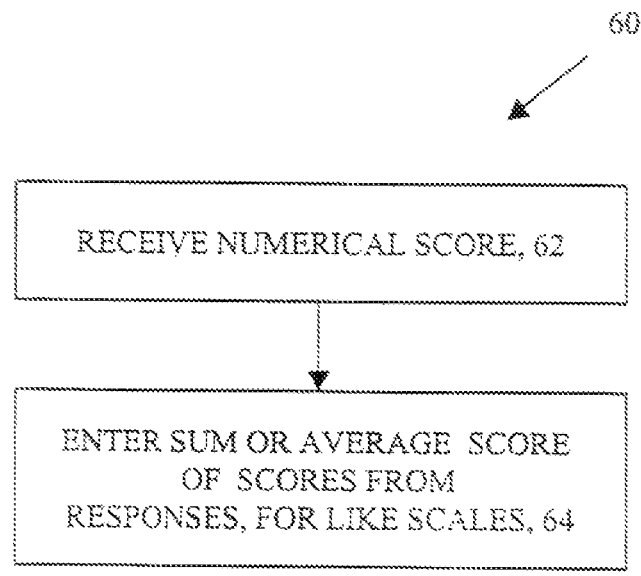
FIG. 5 is a flow chart showing details of a process to produce an aesthetic-based profile tag.

Referring now to FIG. 5, a profile tag forming process 60 takes 62 a numerical score that is assigned to each response and sums 64 that score with like scores from other responses of the user for the same scale. The summation of all of the scores or an average is entered 66 into a field of a vector that corresponds to the location of the scale in the profile tag. The profile tag can have a structure as shown below:

| form | form | form | materials | decoration | decoration | decoration | overall | overall | overall | color | color | novelity |
|------|------|------|-----------|------------|------------|------------|---------|---------|---------|-------|-------|----------|
| A B C | A B C | A B C | A B C | A B C | A B C | A B C | A B C | A B C | A B C | A B C | A B C | A B C |

The profile tag is formed by summing numerical scores that are assigned to each one of the scales tested in the profile process. For example, referring back to Table 1, the user can be shown images that tests the scale "form" that corresponds to whether the user likes solid or open shapes. The response could be a simple yes or no which assigns a value of e.g., 0 or 1, to each one of the levels presented for the scale form. These scales, over a series of images, e.g., 3 to 5 images, could be added up on a scale by scale basis and their sum can be used to represent the first form scale in the result vector.

Alternatively, the customer can express a range of preferences for each scale such as by using a numerical scale, e.g., 1-10. Thus, each field would be populated with values in the range of 1-10 and those values would be added or averaged to produce a value for the profile tag.

Similarly, product tags will be formed in a similar manner using trained persons to grade the products and the product tags will have a similar structure.

Figure 6:
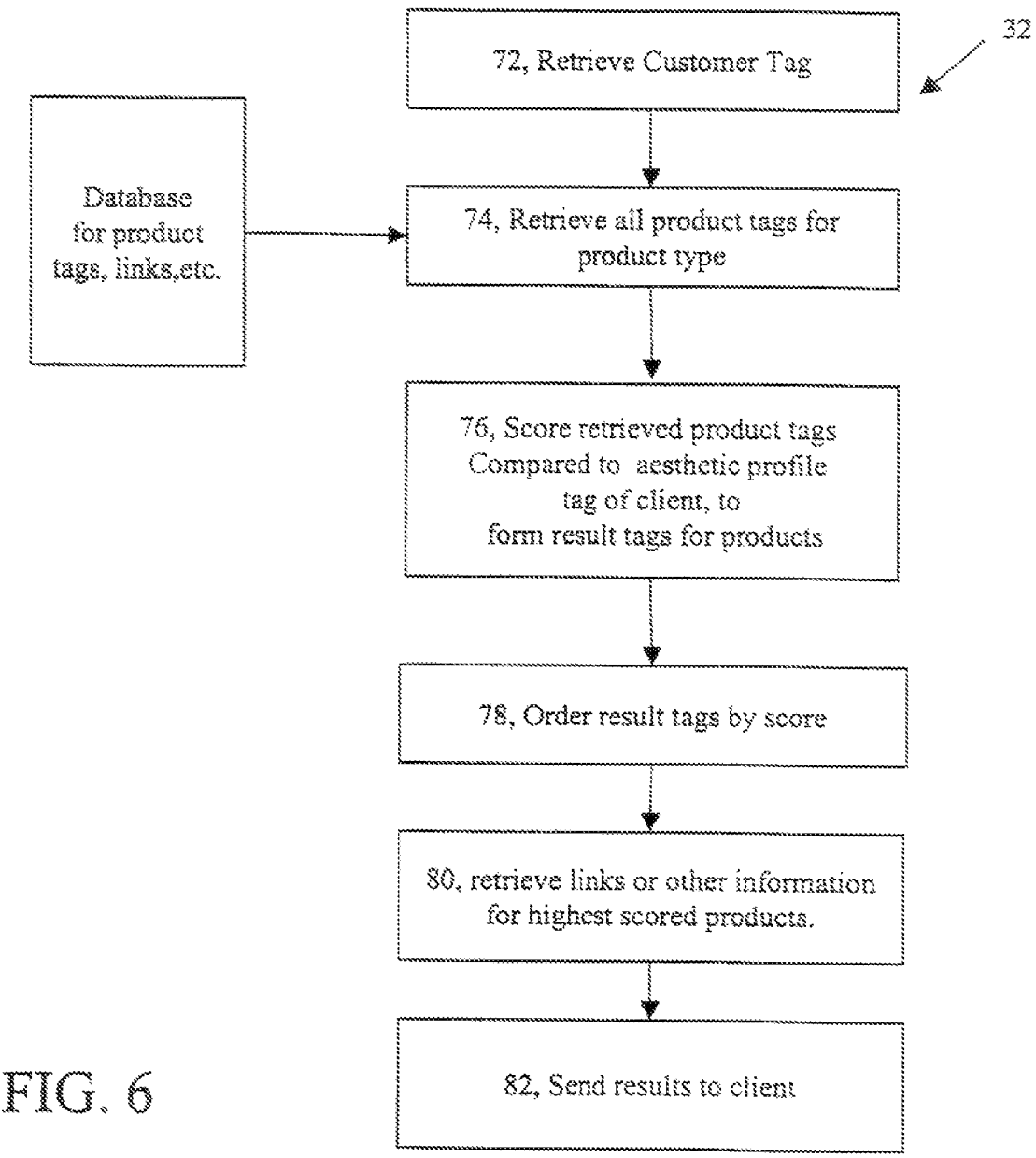
FIG. 6 is a flow chart showing details of a matching process for product selection.

Referring now to FIG. 6, a search and matching engine 70 that searches for products based on a customer aesthetic profile tag is shown. The process 70 retrieves 72 a customer aesthetic profile tag such as can be produced in accordance with the process shown in FIGS. 4 and 5. The process also retrieves 74 all tags for a particular product type that were determined based upon the initial nonaesthetic profile information that the user submitted in conjunction with FIG. 3. The process finds matches 76 of the customer's aesthetic profile tag to aesthetic profile tag that are associated with products that are in the database accessible by the server 16. The matching engine retrieves 78 tags of the particular product type, to match to the profile tag of the user. Predetermined criteria are used to indicate what corresponds to a suitable match. The resulting tags can then be ordered 78 based upon the highest match score. The results can be used to retrieve 80 descriptions and images of the matched products and possibly the score that the product received. The results are sent 82 back to the user where they are displayed in the client web browser.

Alternatively, the tags can be used to access links to other web sites where the products are offered. The scores as well as the links, or the links separately, can be sent back to the user so the user can actually examine the products that have been selected by the search process 70.

Figure 7:
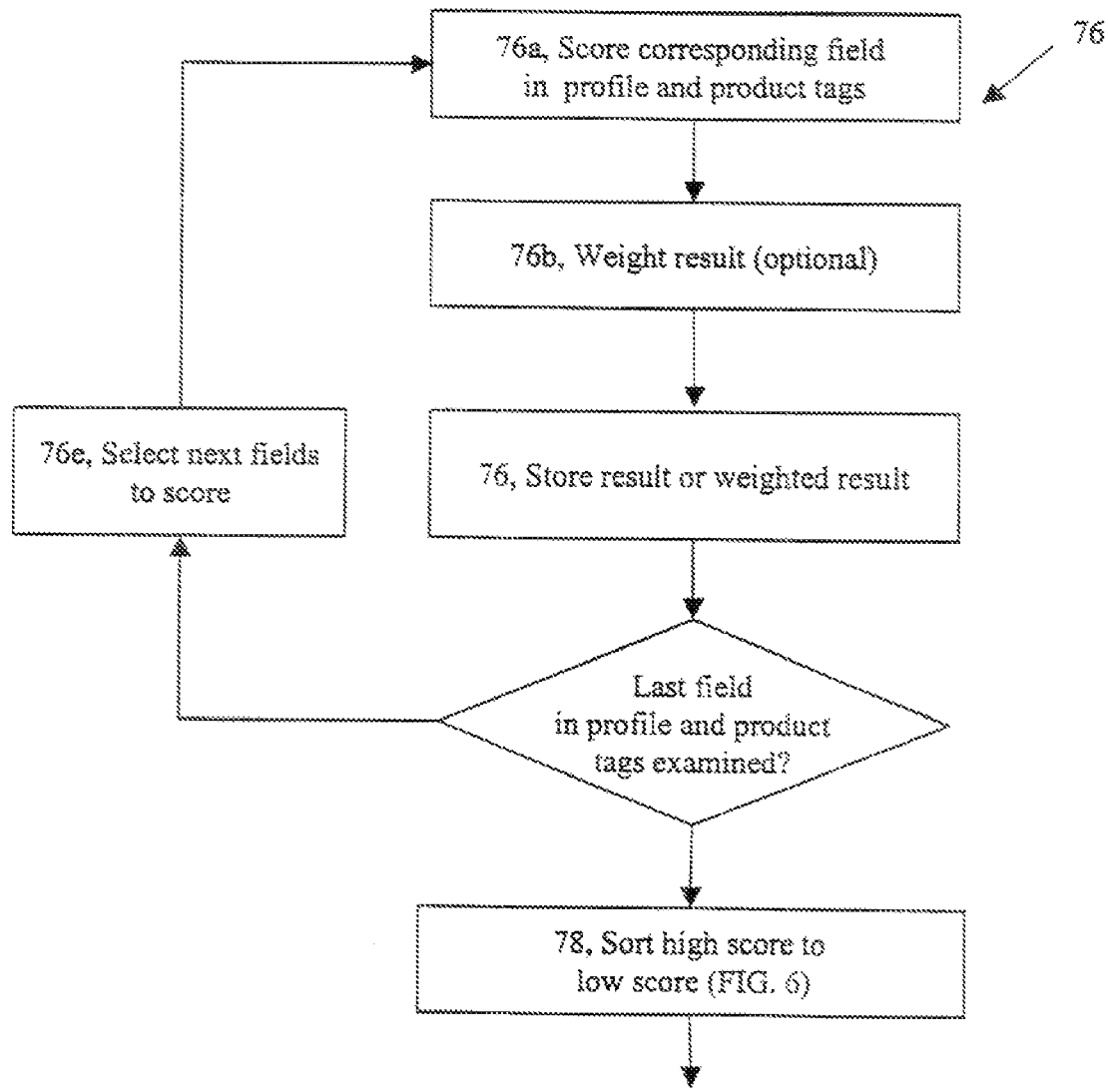
FIG. 7 is a flow chart showing details of matching engine used in the search process of FIG. 5.

Referring now to FIG. 7, the details of the matching process 76 (FIG. 6) are shown. The matching process 76 produces a score 76a for each corresponding field in a profile tag by comparing the value of the field in a profile tag to a value in a corresponding field of the product tag to arrive at a value that indicates the relative agreement between the preferences of the individual and characteristics of the product. One technique could take the absolute value of the difference between both fields with ideally a difference of 0 corresponding to a perfect match, a difference of 1 corresponding to a near perfect match, and values greater than 1 to correspondingly successively poorer matches.

The results are optionally weighted 76b by multiplying the score obtained in the scoring process 76a by a weight factor. The weight factors is either empirically determined or derived from prior knowledge of the aesthetic profile characteristics of the user. The matching process 76 thus can weight specific aesthetic attributes based upon either their relative importance to the particular product or based upon an inference that an individual does not have a particularly high concern for the particular aesthetic attribute.

After weighting 76b the result, the result is stored 76c in a corresponding field of a result tag. The process continues examining the fields of the client and products tags until all fields in the profile tags have been examined or compared against corresponding fields in the product tag. Once the process has finished for the products that are selected in the search process (FIG. 6), the results are sorted 78 as described above.

Figure 8:
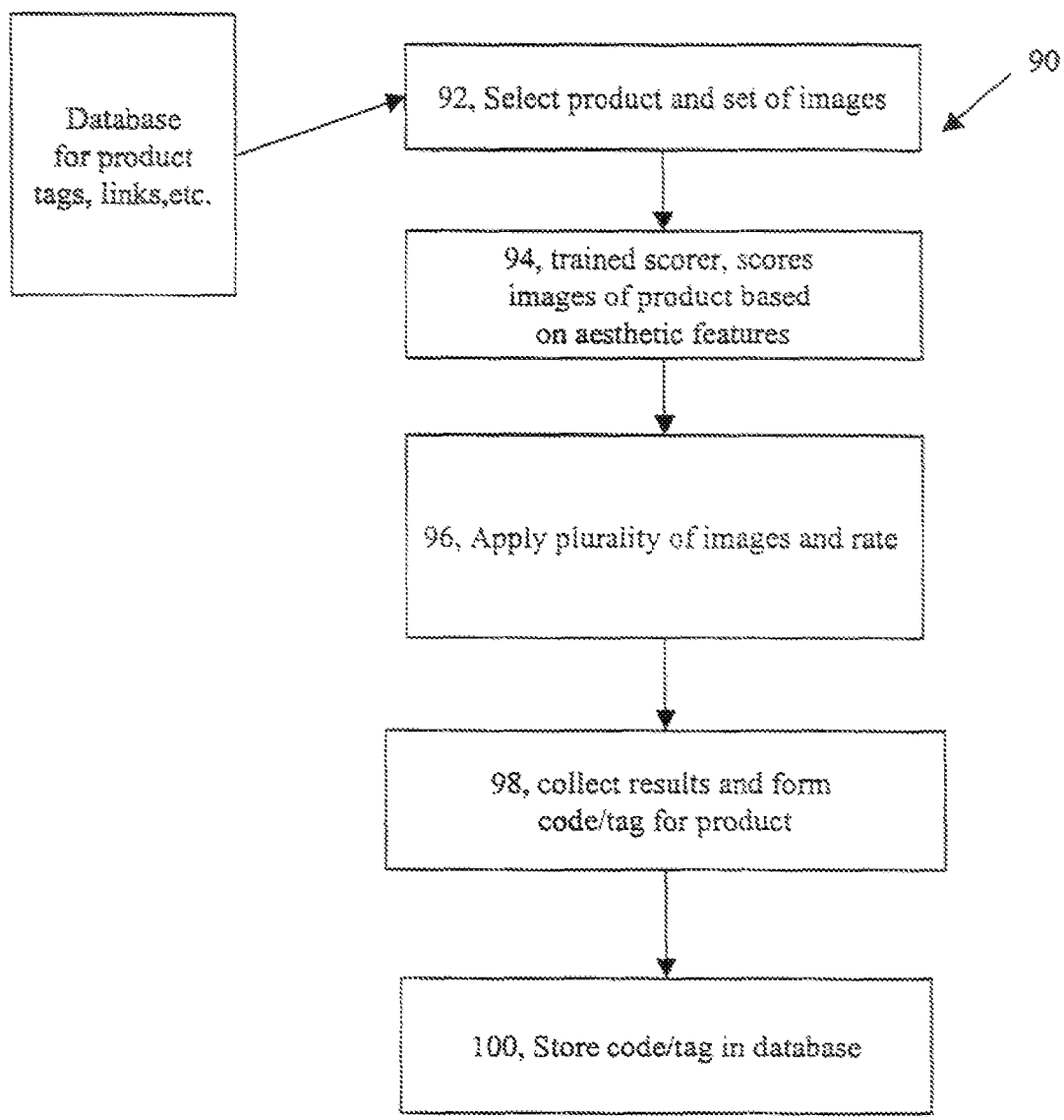
FIG. 8 is a flow chart showing a coding process to code products with aesthetic-based tag identifiers.

Referring now to FIG. 8, a coding process to produce product tags that can be associated with products in the database is shown. The coding process 90 selects 92 an image of a product to score, and has a human scorer 94 score the product image according to predetermined parameters associated with each of the scale levels, as shown in Table 1 above, for the particular product under consideration.

A score is assigned indicating which level of each attribute the product embodies. In the case of Table 1, products would be scored "A", "B", or "C", in each of the thirteen scales. The statistics will be collected 98 and assembled into a code that corresponds to a tag for the product. The tag is stored 100 along with a link to the product or other information associated with the product, so that the tag can be recalled when a particular type of product corresponding to the product being scored is selected by a user, such as described above in conjunction with FIGS. 2-7.

Figure 9:
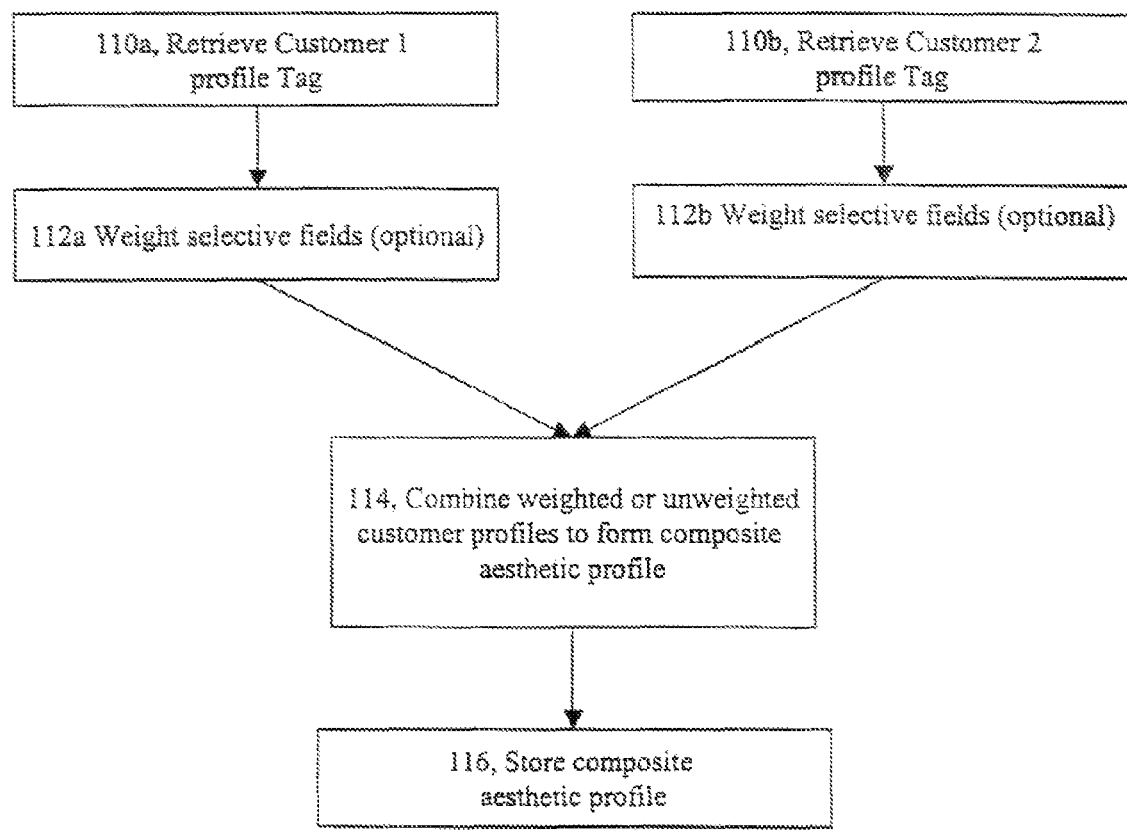
FIG. 9 is a flow chart showing a profile averaging process.

Referring now to FIG. 9, a process 110 for merging profiles from two different customers is shown. This process 110, for example, can be used to allow two individuals such as a husband and wife use their common preferences to search for a particular product such as, for example, by purchasing furniture where often more than one party is involved in the purchase. The process will receive 112a the profile of customer 1, and retrieve 112b the profile of customer 2.

The process 110 can optionally weight 114a, 114b each one of the profiles by assigning a weight that can make one person's profile more prevalent over the other person's profile or optionally could be used to weight certain factors in the nonaesthetic profile generated in conjunction with FIG. 2 heavily towards one customer; whereas, weighting the aesthetic profile features of the process heavily towards the other customer. These weighting factors can be based on preferences stated by the users in queries or can be based on a model or the like.

The optionally weighted profiles of both customers are combined 116 by averaging the values (weighted or unweighted) in each of the tags of the customers to come out with a new, composite profile tag that corresponds to a composite of the individual profile tags. The new composite tag is stored 118 and is associated with both of the identities of the profile of the individuals whose profile was used. The composite profile tag is used to compare to tags of products in the product selection process described above.

Figure 10:
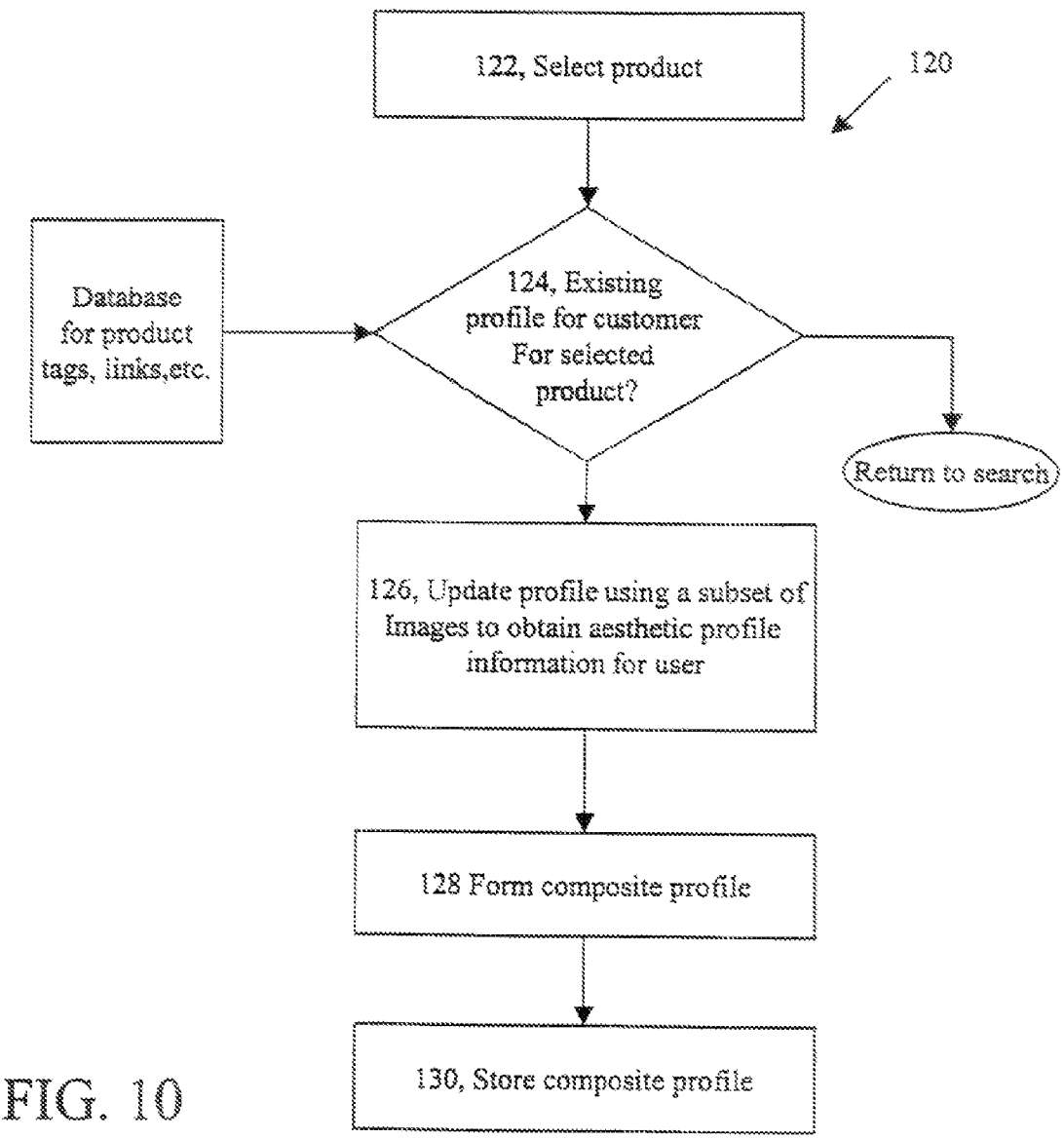
FIG. 10 is a flow chart showing a profile updating process.

Referring now to FIG. 10, process 120 for modifying an existing profile of a user which had previously used the system is shown. The user enters 122 non-aesthetic profile information such as the type of product the client wants to select as above. The process 120 determines 124 whether a profile has been completed for the user for the particular product category (e.g. furniture, or clothing) by examining all stored profiles for the user in the database which are also associated or tagged with products for which they were produced. If a profile has been completed, the process will exit.

Otherwise, if the profile has not been completed, the profile is either updated 126 or a new profile is produced depending on the nature of the products and the nature of the stored profiles. If a new profile is produced the process of FIG. 4 is used again. If the profile is updated 126, the updating is accomplished by showing the user a subset of images especially selected from the set of images. These are examined using the process described above in FIG. 4. A new composite, profile is produced by concatenating or by selecting aspects of the profile information in profiles that were previously obtained from the user, along with the new profile data that was obtained from the user in the update 126 process. The new profile information stored 130 as a new tag for the individual for the particular product that is currently being profiled.

The process 25 gives clients and vendors the ability to determine the customer's actual aesthetic tastes (preferences) and apply knowledge of these aesthetic tastes to the market. The interactive testing enables profile collection by testing a client about his aesthetic taste. The process 25 does not rely on an assumption that there is an agreed upon meaning to words used to describe aesthetic characteristics. Moreover, the process 25 does not need to assume that the client would actually know their own preferences when a style or characteristic is only expressed as a word. Some people may not necessarily know what they prefer in a verbal way, but do have preferences, that can be obtained through images. When faced with two different objects, a person can have a preference for one object or the other object. The client need not explain why they have a preference.

The process 25 could use software that is written to train individuals as product scorers to evaluate and score products in each of the 12 scales and 3 levels mentioned above. The process 25 could teach the product scorers how to evaluate various criteria by giving examples for each of the different scales at the different levels.

There are variations of this process 25. For example, the process 25 can be modified to identify architectural features. The process 25 can be modified to help people determine the architectural style their house or what architectural style they would like in a house.

This variation would show clients images of components of houses such as doors, windows, an overall shape of a house, and so forth. In each case the client would pick the style of these components that closely matches the style of their house or their preference for a house. The matching engine will add up the features and determine what is the closest recognizable style for the group of components that they described. The process can make recommendations as to products that would fit within that style. Therefore, if the client describes an aesthetic profile that corresponds to a Victorian house, the process will present e.g., doors, windows, tile, wall coverings, and so forth that fit within a Victorian house.

The process can use an interactive text component where the process can describe a variety of windows for example and the client can query the process for advantages and disadvantages of the particular window versus a different window, because most styles allows for a variety of components. The process can give the features of the components and explain why the client might want to select one window over the other.

Figure 11:
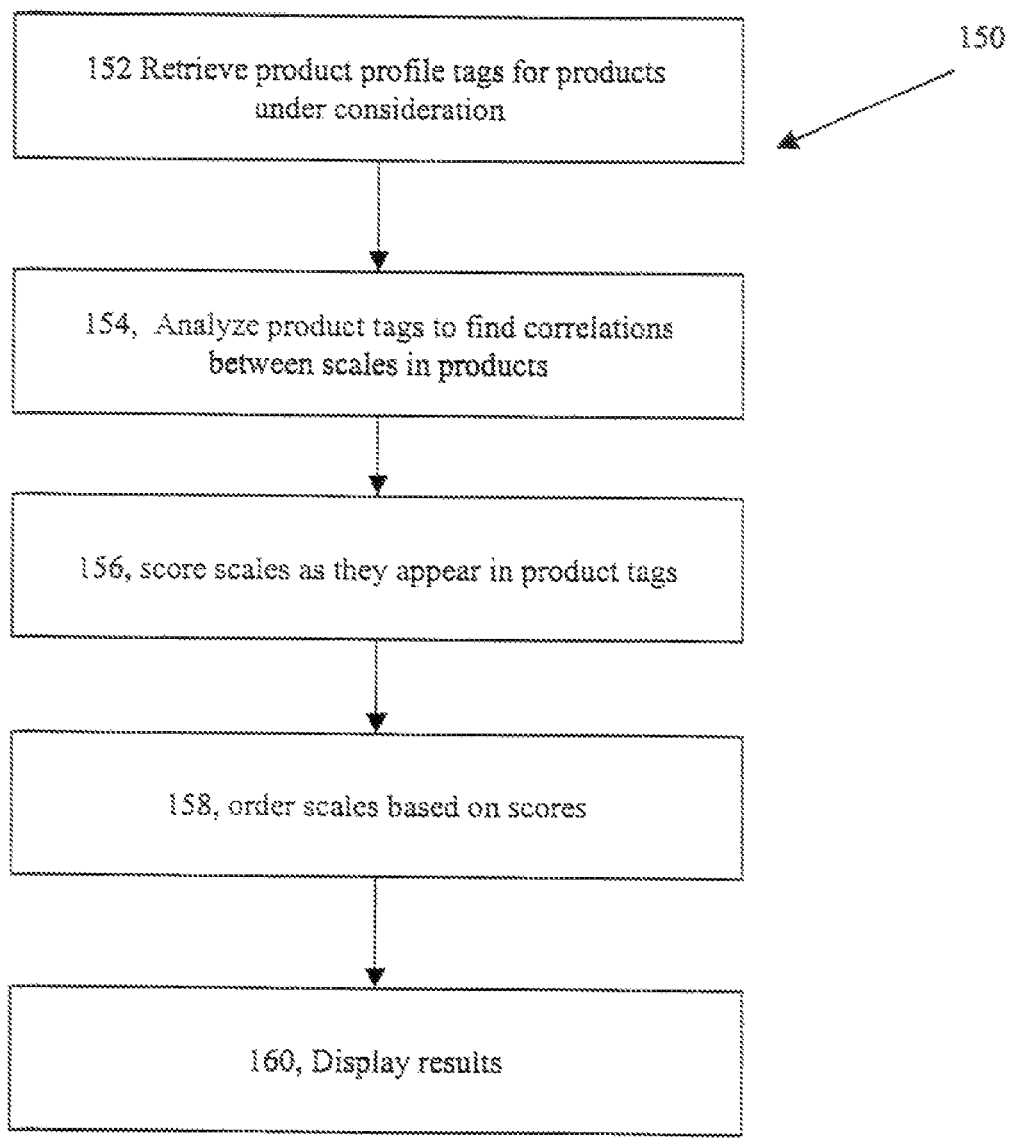
FIG. 11-12 are flow charts showing a sales analysis process based on product aesthetic characteristics.

Referring now to FIG. 11, a sales analysis process 150 is shown. The sales analysis process 150 examines sales of products to determine what aesthetic considerations may have been used by customers when purchasing the products. The process 150 is initiated by retrieving 152 product profiles tags for all products under consideration. The products under consideration can be of the same type (e.g., chairs), class (e.g., all furniture) or classification (e.g., all modern furniture). The products under consideration for analysis could cut across product classes (e.g., lighting and furniture). In general, it is only necessary the product classes share at least some scales. The product tags are the tags as produced in accordance with the process shown in FIG. 8.

The process 150 analyzes 154 the product tags to correlate scales for products that sell well and for those products that do not sell well. The analysis process 154 examines tags of the products and scores the scales in the product tags of products based on the product selling history. The scales are ordered 158 based upon score. The results can be used to give insights into future purchases by a merchant of new products that are strong in particular scale factors, e.g. highest score or products that are weak e.g., lowest scores. The results can be displayed to a user 160 in a client web browser.

Figure 12:
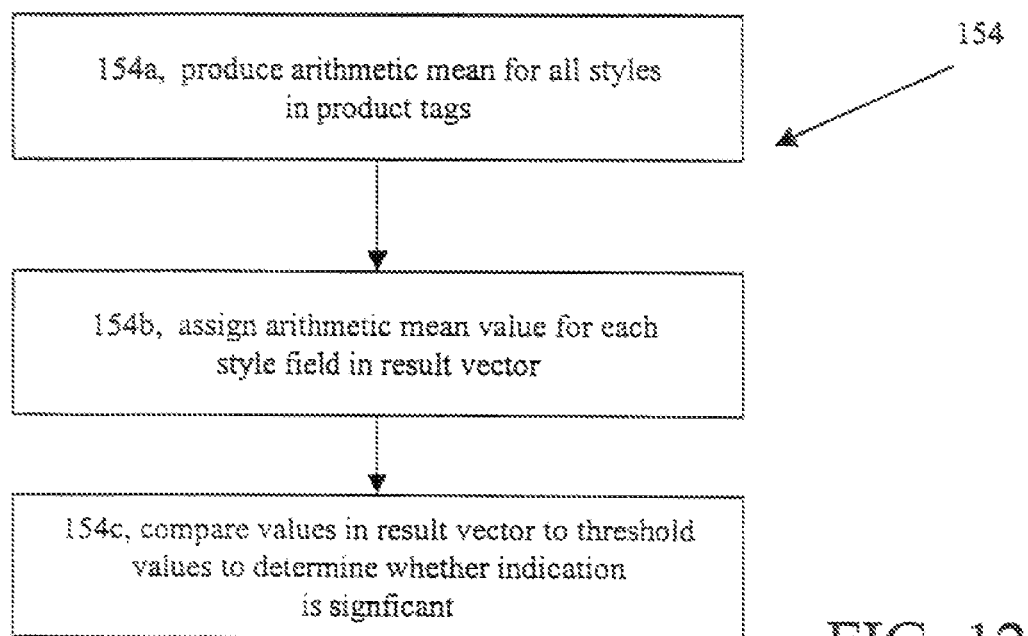

Referring now to FIG. 12, the details of the analysis process 154 (FIG. 11) are shown. The analysis process 154 produces 154a a score for each corresponding field of the product tags by comparing the values of the fields over all product tags under consideration. One embodiment could use a simple arithmetic mean value to assign 154b a value in a corresponding field of a result vector. This process can occur over all of the fields in the product tag.

The result vector includes a value that indicates the average prevalence of a particular scale over a group of products, giving a vendor insight as to which aesthetic characteristics of its products appeal to customer aesthetic preferences. The individual fields in the product tags can be ordered to give an indication of the strength of the aesthetic preferences in making buying decisions. One technique could use a threshold 154c to determine whether a value in the results field is significant or not.

The server can conduct an analysis of vendors products whose aesthetic attributes are stored in the database as possible referral choices. The server analyzes all of the products by ordering 154c produced by popularity (which were chosen most often) and compares 154d the profiles of the most popular products to the least popular products to inform the vendor as to which attributes contributed the most to sales. The server 16 can also compare the attribute profile of the vendors products to the entire database of similar products to compare what product profiles sold best/worst in the entire category. The server could also rank the vendor's products into a variety of tiers, (top 25%, next 25%, lower 25%, bottom 25%) and analyze the attribute profiles as explained above, against the vendor's own products, and against all products in the same class. This could enable a vendor to see why their top selling products did well, but why their middle selling products were outperformed by other vendors.

The process can also analyze the sales of an off-line vendor by tagging their products with the aesthetically-based attribute tags. The process can analyze their sales data to indicate which attributes contributed most to sales. The process can also be used to compare data to aggregated data of similar products. For example, even though the vendor's top sellers have particular attributes, the process could discover when compared to data in the on-line database that other attributes could result in even higher sales.

The process can also be used to publish non-commissioned, syndicated reports that can be made available on a website, or offline by subscription or direct sale. The report can show the best and worst (by popularity) attribute profiles in a variety of categories. Vendors could learn what product features to buy, or how to redesign their product attributes to increase sales.

Figure 13:
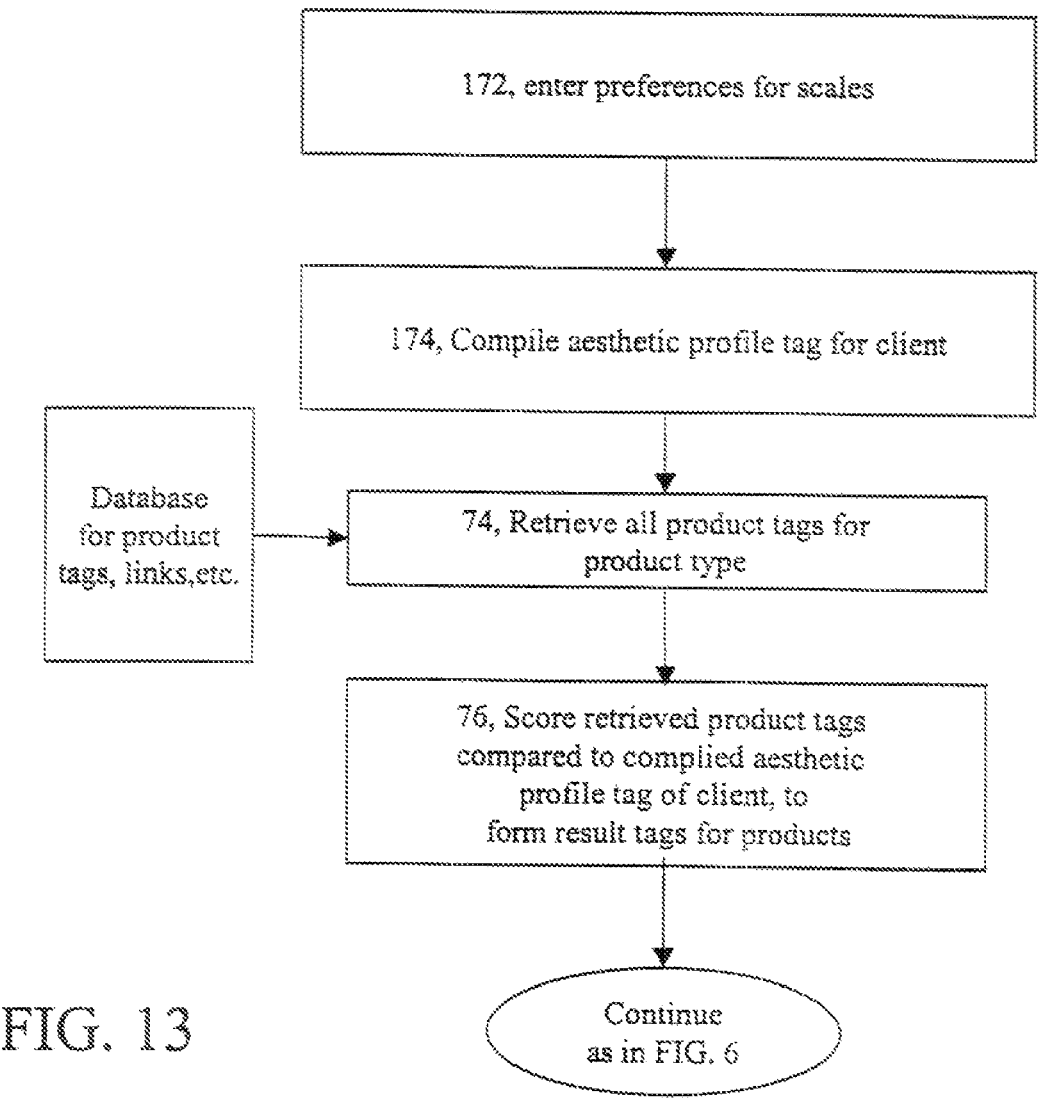
FIG. 13 is a flow chart showing an alternative process for collecting aesthetic profile information of a customer.

Referring now to FIG. 13, aesthetic based searching process is shown. A client can access the server and using a search engine search by attribute(s) for products. The client enters 172 a preference in any one or all of the attribute scales, without using their profile. For example, using the scales previously listed, one could search for a chair that was: closed, curvy, complicated, machined, highly decorated, organic, etc. Or one could just search for playful chairs, with no other attribute specified. From the choice made by the user, the server would compile 174 and aesthetic profile tag. The matching process 74, 76 (FIG. 6) would work the same way as the profiling match, with the desired attributes being matched against the product tags. In the case of one or a couple of desired attributes, many products would be returned, in the case of many desired attributes, few or no products would be an exact match. In that case, the user could be asked to eliminate some attributes, or to accept less than perfect matches. The user could be permitted to optionally weight the desired attributes, in essence producing a similar profile as they would if they took the test. A user could specify a 100% preference for curved form, but a 70% preference for novelty. The user could optionally save this created profile as their primary profile, or as an additional profile.

This technique to produce a profile by answering questions concerning scales rather than taking the test would also be useful to create additional profiles, for friends or relatives, or for different residences or occasions. For example, a user might have two residences that they would like to furnish in different ways, they therefore could create a primary residence profile and a "beach house" profile. Depending on which house they were shopping for, they would call up different profiles. In the case of clothing or jewelry, they could create a "work", "night on the town", "casual weekend", and other profiles to search according to different criteria.

Referring now to FIG. 14, an exemplary graphical user interface useful in the process of FIG. 13 is presented as a web page 200. The web page 200 includes information contained in Table 1 (see above). The information is presented as a series of questions regarding each of the scales. The user is prompted to select preferences. For example, as shown in the web page 200, a question 202 for the scale "material" has levels A-C with the descriptions of each of the levels thereunder. The descriptions within each of the levels can be links to a web page that displays a definition of the scale being tested at that level.

Moreover, within each of the levels are boxes or controls. A first box 212 will launch an image of an object which possess the desired characteristics. Whereas, the second box 214 will be control that the user can use to enter a value corresponding to its preference for that particular style.

The graphical user interface 200 can be adapted to produce an interface for the process described in conjunction with FIG. 6. In this instance, the graphical user interface might eliminate, for example, all the text explanations associated with each of the scales and sub-scales being tested and would simply provide the user with one or more images that test those particular scales to which the user can respond by selecting a control that specifies "like" or "dislike" or, alternatively, to which the user can respond over a range of preferences, e.g., by using a sliding scale control that presents a value from, e.g., one to ten. Other techniques for inputting the range could alternatively be used such as a text entry and so forth.

Other embodiments are within the scope of the appended claims.

What is claimed is:

1. A computer executed method of analyzing sales data for products, the method comprising:
    retrieving, by a computer, product profile tags for a plurality of products, each product profile tag including values for a set of aesthetic characteristics of the respective product, the values including a set of levels corresponding to different variations of the respective aesthetic characteristic, each level having a score value for the particular variation of the particular aesthetic characteristic of the product;
    performing, by the computer, a numerical calculation based on the score values included in the product profile tags of two or more of the products to determine a set of calculated values for at least one aesthetic characteristic in common for the two or more products;
    receiving by the computer sales data for each of the two or more products; and
    correlating, by the computer, the determined grade corresponding to the particular aesthetic characteristic of the two or more products with the received sales data for the products.

2. The method of claim 1 further comprising:
    producing an aesthetic profile, for the two or more products, the aesthetic profile including two or more determined aesthetic characteristics;

storing the grade of each determined aesthetic characteristic in each product's respective aesthetic profile;
ranking products by volume of sales;
retrieving aesthetic profiles of the products; and
determining from the retrieved profiles, aesthetic characteristics of the products that are predictors of how the products are ranked by sales.

3. The method of claim 2 wherein determining comprises:
examining the aesthetic profiles of the products to determine which aesthetic characteristic most attributed to the sales ranking assigned to the products.

4. The method of claim 3 further comprising:
determining an average value for the determined aesthetic characteristic that most attributed to the sales ranking assigned to the products over two or more products having a relatively high sales ranking in comparison to at least one other product in the plurality of products that has a comparatively low sales ranking.

5. The method of claim 4 further comprising:
comparing the average value of the determined aesthetic characteristic that most attributed to the sales ranking assigned to the products to a threshold value to determine whether the aesthetic characteristic contributes towards purchase of the product.

6. The method of claim 1 further comprising:
ranking products according to sales of the products; and
examining aesthetic profiles of the pair of products to determine which combinations of aesthetic characteristics of the products contributes to the sales ranking assigned to the products.

7. The method of claim 1 wherein the products are of similar product type.

8. The method of claim 1 wherein the products are from different vendors.

9. The method of claim 1 wherein the products are of different product types with the products sharing common aesthetic characteristics.

10. A computer program product residing on a computer readable media, the computer program product for analyzing sales of products comprises instructions for causing a computer to:
retrieve product profile tags for products, said product profile tags including fields that have values, wherein each value corresponds to a grade on a scale of a particular aesthetic characteristic of the products;
perform a numerical calculation based on the values included in the product profile tags of two or more of the products to determine a grade on at least one scale for the particular aesthetic characteristic for at least a pair of products; and
correlate the grade corresponding to the aesthetic characteristic of the two or more products with sales data for the products.

11. The computer program product of claim 10 wherein instructions to correlate values comprise instructions to:
determine a score based on the correlation between the values corresponding to the same aesthetic characteristic across the two or more product profile tags and the sales data for the products; and
order the aesthetic characteristics based on the scores.

12. The computer program product of claim 10 wherein instructions to analyze product tags comprise instructions to:
calculate an arithmetic mean value for aesthetic attributes over two or more product profile tags; and
compare the arithmetic mean value to a threshold value to determine whether the arithmetic mean value is a significant influence on sales of the product.

13. A computer program product residing on a computer-readable media for analyzing sales data for products comprises instructions to cause a computer to:
group products by amount of sales revenue;
retrieve aesthetic profiles of the products, wherein each aesthetic profile includes a numerical value indicating the strength of a determined aesthetic characteristic embodied by a product; and
perform a calculation based on the numerical values included in the aesthetic profiles of the products to determine from the retrieved profiles, aesthetic characteristics of the products that are predictors of how the products are grouped by sales revenue.

14. The computer program product of claim 13 wherein instructions to determine from the retrieved profiles, aesthetic characteristics of the products that are predictors of how the products are grouped by sales revenue comprise instructions to:
examine the aesthetic profiles of the products to determine which aesthetic characteristics of the products most contributed to the product being classified in a certain group.

15. The computer program product of claim 13 wherein instructions to determine from the retrieved profiles, aesthetic characteristics of the products that are predictors of how the products are grouped by sales revenue further comprise instructions to:
determine an average value for one or more aesthetic characteristics across the aesthetic profiles for the products in a group based on the numerical values included in the aesthetic profiles.

* * * * *